United States Patent

Hagiwara et al.

[11] Patent Number: 5,755,447
[45] Date of Patent: May 26, 1998

[54] METAL GASKET WITH SHIM

[75] Inventors: Yoshiyuki Hagiwara, Okazaki; Hirotaka Kakuta, Toyoake, both of Japan

[73] Assignee: Taiho Kogyo Co., Ltd., Toyota, Japan

[21] Appl. No.: 251,636

[22] Filed: May 31, 1994

Related U.S. Application Data

[63] Continuation of Ser. No. 934,897, Aug. 26, 1992, abandoned, which is a continuation of Ser. No. 778,443, Oct. 17, 1991, abandoned.

[30] Foreign Application Priority Data

Oct. 20, 1990 [JP] Japan ................. 2-282555

[51] Int. Cl.[6] ............................... F16J 15/08
[52] U.S. Cl. ............ 277/601; 277/593; 277/595; 29/888.3; 219/86.1; 219/87; 219/121.64
[58] Field of Search .............. 277/235 B, 234, 277/236, 213; 29/888.3; 228/182.19, 153, 154, 185; 219/91.2, 86.1, 86.9, 78.01, 87, 121.63, 121.64

[56] References Cited

U.S. PATENT DOCUMENTS

| | | | |
|---|---|---|---|
| 2,250,617 | 7/1941 | Argentin | 219/91.2 |
| 2,330,219 | 9/1943 | Kemmer | 219/91.2 X |
| 2,737,405 | 3/1956 | Shinn | 277/235 B X |
| 4,272,085 | 6/1981 | Fujikawa et al. | 277/236 |
| 4,471,204 | 9/1984 | Takafuji et al. | 219/121.63 |
| 4,721,315 | 1/1988 | Ueta | 277/235 B |
| 4,776,073 | 10/1988 | Udagawa | 277/235 B X |
| 4,857,697 | 8/1989 | Melville | 219/121.63 |
| 4,935,029 | 6/1990 | Matsutani et al. | 219/121.63 |
| 4,940,878 | 7/1990 | McKee | 219/121.64 |
| 5,026,967 | 6/1991 | Bell et al. | 219/121.63 |

FOREIGN PATENT DOCUMENTS

| | | | |
|---|---|---|---|
| 2220536 | 11/1972 | Germany. | |
| 3305887 | 9/1983 | Germany. | |
| 3741344 | 6/1989 | Germany. | |
| 59-188955 | 12/1984 | Japan. | |
| 1370125 | 10/1974 | United Kingdom | 277/213 |
| 2115503 | 9/1983 | United Kingdom. | |

OTHER PUBLICATIONS

"Industrielaser", Verlag Moderne Industrie 1987, no translation, author unavailable.

K.J. Miller et al., "Laser Welding," *Machine Design*, vol. 37, No. 18, Aug. 5, 1965, pp. 120-125, Cleveland, Ohio, U.S.

Yoichi Nakajima, "Mechanical properties of spot welds in 304 stainless steels made by YAG laser welding," *Welding International*, vol. 1, No. 5, 1987, pp. 485-489, Abington, Cambridge, Great Britain.

*Primary Examiner*—Daniel G. DePumpo
*Attorney, Agent, or Firm*—Sughrue, Mion, Zinn, Macpeak & Seas, PLLC

[57] ABSTRACT

The invention is directed to a metal gasket for sealing a clearance between a pair of clamping members. The metal gasket is formed of a metallic base plate on which at least one opening is defined. An annular metallic shim is welded on the base plate around the opening thereof. The annular metallic shim is disposed around the opening, and welded on the base plate by spot welding, forming a plurality of nuggets in series around the shim in such a manner that two adjacent nuggets overlaps each other and a space between those two nuggets is smaller than a diameter of each nugget.

7 Claims, 2 Drawing Sheets

METAL GASKET WITH SHIM

This is a Continuation of application Ser. No. 07/934,897 filed Aug. 26, 1992, now abandoned which is a continuation of 07/778,443 filed Oct. 17, 1991, and now abandoned.

BACKGROUND OF THE INVENTION

1. Field of the Invention

The present invention relates to a metal gasket having a shim, and more particularly to a metal gasket formed of a metallic base plate having at least one opening and an annular metallic shim provided therearound. The shim is preferably disposed between a cylinder head and a cylinder block of an internal combustion engine.

2. Description of the Related Art

For sealing a clearance between surfaces to be sealed, e.g., a cylinder head and a cylinder block of an internal combustion engine, various gaskets are disposed therebetween. A conventional gasket utilized in internal combustion engine has a plurality of openings, e.g., combustion openings, coolant openings, oil openings and bolt holes, and is clamped between the cylinder head and cylinder block so that combustion gas, coolant and oil will not spread from those openings. In order to provide uniform sealing between the cylinder head and cylinder block, it has been proposed to employ a metal gasket, which includes an elastic metallic base plate defining the above-mentioned openings and having beads formed around the combustion openings to ensure a high sealing pressure, especially around the combustion openings.

Further, in Japanese Utility model Laid-open Publication No.59-188955, there is disclosed a sealing pressure adjusting plate whose thickness is smaller than the height of the bead, and which is disposed adjacent to the bead, so as to avoid a reduction in sealing pressure due to undesirable plastic deformation of the bead caused by a clamping force applied thereto.

Preferably, the material of the above-described sealing pressure adjusting plate, which is provided to hold the bead in its effectively compressed condition to act as a sealing member, may also have a sealing effect to act as a sealing member as it is. In view of productivity, thickness controllability, cost, and the like, it is preferable that an annular metallic shim is provided around the periphery of an opening of the base plate for passing a pressurized fluid therethrough.

On the one hand, it is most appropriate to weld the annular metallic shim on the metallic base plate. On the other hand, the shim must be fixedly connected to the base plate, so as to prevent it from being separated from the base plate and eliminate clearance between the shim and base plate. In the case where the shim is welded on the base plate by means of spot welding for example, a certain clearance between the shim and the base plate will occur at each space between two adjacent welded sections or nuggets, and also it is difficult to ensure a sufficient welding strength.

In accordance with a recent progress in the field of laser processing, a laser welding machine has been effectively employed to provide rapid welding with little welding strain. In particular, a welding machine using a YAG laser actuated by repeated pulses is small in size, and it has desirable characteristics for welding the shim to the base plate, such that a plurality of nuggets may be made at high speed. However, the nuggets are still made with an appropriate space between two adjacent nuggets in view of welding speed, welding strength or the like.

SUMMARY OF THE INVENTION

It is, therefore, an object of the present invention to provide a metal gasket having an annular metallic shim welded by spot welding on a metallic base plate with an appropriate welding strength, and ensure a good productivity of the metal gasket.

It is another object of the present invention to provide a metal gasket which may be disposed between a cylinder head and a cylinder block of an internal combustion engine for enabling an effective sealing therebetween.

In accomplishing these and other objects, a metal gasket includes a metallic base plate which has at least one opening defined therein, and an annular metallic shim disposed on the base plate around the opening. The shim is welded on the base plate by spot welding to form a plurality of nuggets in series around the shim, with a space between two adjacent nuggets held smaller than a diameter of each nugget. Thus, a substantially continuous welding zone will be made with two adjacent nuggets overlapping each other.

Preferably, the annular metallic shim is welded on the base plate to form the nuggets to fulfill $0.4 \leq s/d \leq 0.8$, where s represents the space between two adjacent nuggets, and d represents the diameter of each nugget.

The base plate is preferably provided with a bead protruded around the opening, and the shim may be welded on the base plate at the side thereof with the bead protruded therefrom.

The metal gasket may be clamped between a cylinder head and a cylinder block of an internal combustion engine.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
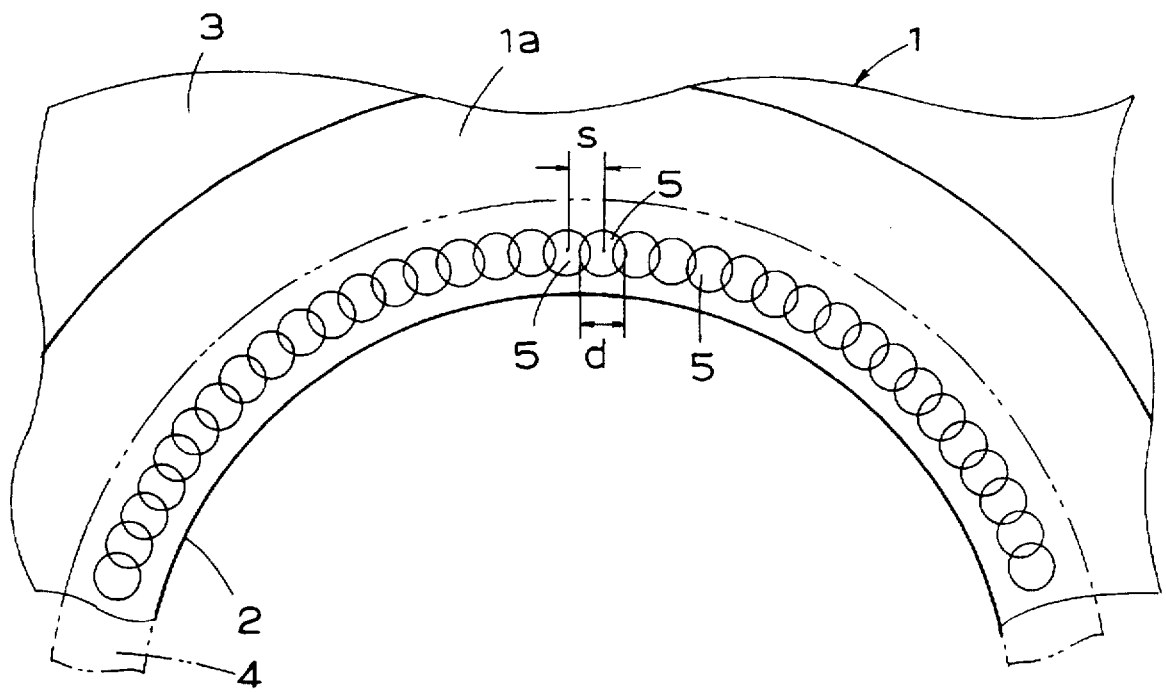
FIG.1 is a plan view of a part of the preferred embodiment of a metal gasket according to the present invention.

Referring to FIG.1, there is illustrated a part of a gasket made of metal and used for a multicylinder internal combustion engine according to an embodiment of the present invention. The gasket comprises a base plate 1 of a flat elastic metal, e.g., stainless steel, which defines a plurality of fluid openings including a combustion opening 2, coolant openings (not shown) and oil openings (not shown), as well as bolt holes (not shown), and which has an annular bead 3 formed around the combustion opening 2.

Figure 2:
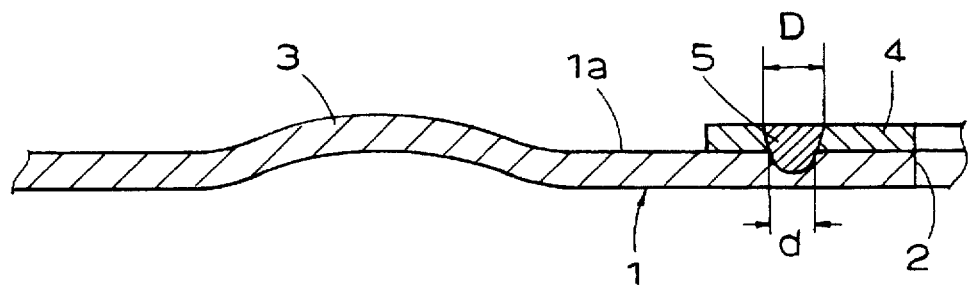
FIG.2 is a sectional view of a part of the metal gasket shown in FIG.1.

The bead 3 is embossed around the combustion opening 2 to form annular arcuate configuration as shown in FIG.2. Planar portion 1a extends from the inner periphery of the bead 3 to the combustion chamber 2 surrounded thereby. On the planar portion 1a, an annular metallic shim 4, or annular spacer made of metal, e.g., stainless steel, is disposed at the side of tip end of the bead 3 protruded from the base plate 1.

The shim 4 is made from a stainless steel plate, which is thinner than the height of the bead 3, and which is stamped to form an annular ring through a stamping process, with its inner periphery corresponding to the periphery of the combustion opening 2. Then, the shim 4 is welded on the base plate 1 by spot welding as described below.

Figure 3:
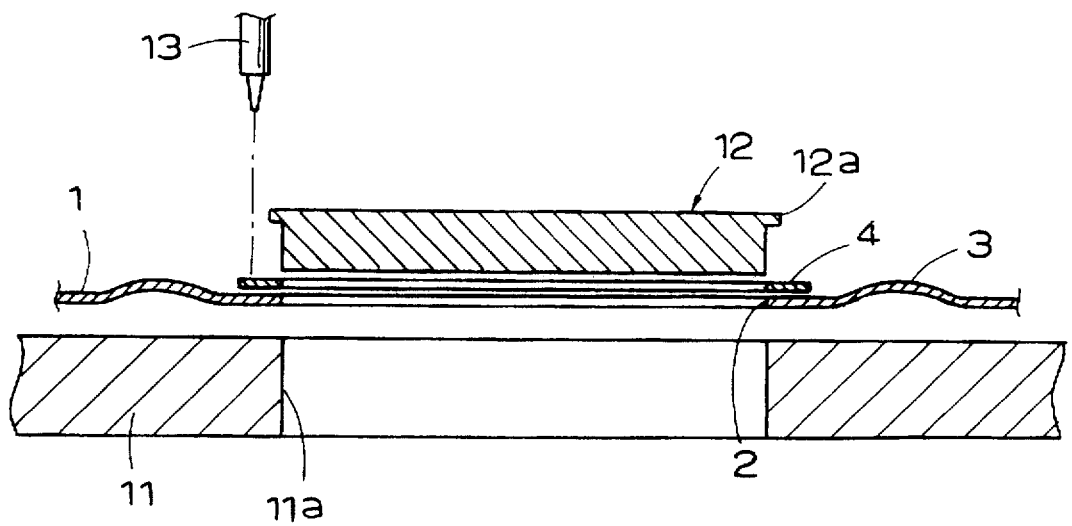
FIG.3 is a sectional view of a part of laser welding machine for welding an annular metallic shim on a metallic base plate.

FIG.3 illustrates a table 11, a positioning jig 12 and a focus head 13 of a laser welding machine of pulse control employed in this embodiment. The table 11 has an opening 11a which corresponds to the combustion opening 2. The positioning jig 12 is formed to be fitted into the opening 11a of the table 11, and provided with a positioning extension 12a which extends radially at its upper portion. The laser welding machine in this embodiment is arranged to actuate a YAG laser by repeated pulses, and focus on a metal a high density of laser power through a focus head 13 to heat the metal rapidly. Consequently, the metal is formed with a plurality of welded sections, or nuggets.

The shim 4 is welded on the base plate 1 as follows. At the outset, the base plate 1 having the combustion opening 2 or the like is placed on the table 11 and positioned on the planar portion 1a of the base plate 1 in such a manner that the inner periphery of the shim 4 lies on the periphery of the combustion chamber 2. Next, the lower portion of the positioning jig 12 is fitted into the opening 11a of the table 11 with the positioning extension 12a pressed on the inner peripheral portion of the shim 4, to thereby clamp the shim 4 between the table 11 and the positioning jig 12. Thereafter, the shim 4 is tightened between the table 11 and the positioning jig 12 by bolts (not shown) or the like.

Then, the table 11 is moved such that the focus head 13 traces along the periphery of the shim 4, and a laser beam is applied to the shim 4 through the focus head 13 at a certain interval to thereby weld the shim 4 on the planar portion 1a of the base plate 1 along its whole periphery. In the alternative, the focus head 13 may be moved against the table 11, provided that the base plate 1 and shim 4 on the table 11 are arranged to move relatively to the focus head 13.

As shown in FIG.1 which enlarges a welding zone of the shim 4 on the base plate 1, the welding zone is formed on the base plate 1 in such a manner that a plurality of welded sections having approximately circular configurations in its plan view, i.e., nuggets 5 are formed in series overlapping each other.

Each nugget 5 has a diameter (D) at the surface of the shim 4 which is larger than a diameter (d) at the surface of the base plate 1, as shown in FIG.2. A space between the centers of two adjacent nuggets 5, 5 overlapping each other (hereinafter referred to as a welding space) is represented by s in FIG.1. A welding strength (F) between the shim 4 and base plate 1 varies according to a ratio (e) of the welding space (s) and the diameter (d) of the nugget 5, or (s/d). That is, the welding strength (F) varies in accordance with the following formula (1) in the case of $0 < e \leq 1$, while it varies in the accordance with the following formula (2) in the case of $1 < e$.

$$F \propto (e\sqrt{1-e^2} + \sin^{-1}e)/2e \quad (1)$$

$$F \propto \pi/4e \quad (2)$$

Therefore, the smaller the value of ratio (e) is, the grater the welding strength (F) becomes, while it will not cause a big difference when the ratio (e) is smaller than 0.4, as described later. On the contrary, if the ratio (e) exceeds 0.8, the welding strength (F) decreases largely. In the case where the welding strength varies at a great rate according to the ratio (e) as in the latter case, a great influence will be caused if the value of diameter (d) of the nugget 5 is distributed largely due to a change of welding condition. Accordingly, it is desirable to control the value of ratio (e) within a certain range.

Figure 4:
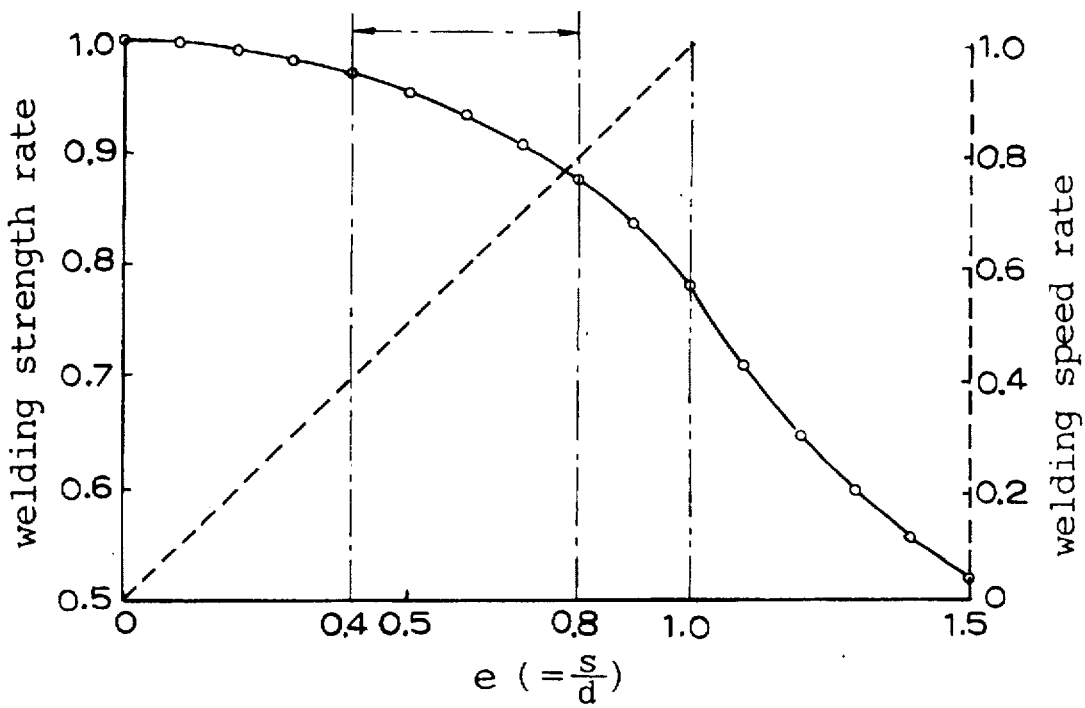
FIG.4 is a diagram for providing an appropriate condition for welding the shim on the base plate.

In FIG.4, a solid line represents a rate of welding strength which is varied in response to an increase of the ratio (e), provided that the welding strength (F) is 1 (100%), in case of e=0, i.e., when the welding space is substantially zero to be in the same condition as in a continuous welding condition. When the ratio (e) exceeds 1, the welding strength rate is largely decreased, such that it drops down to nearly 50% when the ratio (e) is 1.5. On the other hand, when the ratio (e) becomes less than 0.4, the welding strength rate exceeds 97%. The decreasing rate of the welding strength rate is not so large until the ratio (e) becomes 0.8, while the welding strength rate of 88% is ensured when the ratio (e) is 0.8.

The diameter (d) of the nugget 5 may be determined according to a necessary welding strength between the base plate 1 and shim 4, while the lowest level of the welding space (s) is determined by characteristics of the laser welding machine. In the case where the laser welding machine is operated with its maximum power, a welding speed rate varying in response to increase of the ratio (e) is obtained to be approximately proportional to the ratio (e) as shown in a phantom line in FIG.4, provided that the welding speed is 1 (100%) in case of e=1. The welding speed affects the life of a lamp used for the laser welding machine, so that the welding speed rate corresponds to a remaining life rate of the lamp, which is omitted in FIG.4 showing only the welding speed rate because the remaining life rate of the lamp varies in the same way as the welding speed rate.

As shown in FIG.4, when the ratio (e) exceeds 0.8, the welding speed rate exceeds 0.80% to obtain a desirable productivity, whereas the welding strength rate is largely decreased as described before. In the case where the ratio (e) is smaller than 0.4, the welding speed rate is decreased down to less than 40% to cause a poor productivity, although the welding strength rate is of almost 100% when the ratio (e) is 0.4, so that its increasing rate is very small. Also, a heat energy supplied to a unit area of the welding zone is in inverse proportion to the ratio (e). Therefore, if the ratio (e) is set too small, other problems such as warping of the gasket will be caused as in the case of the continuous welding.

As a result, in order to obtain an appropriate welding strength ensuring a certain productivity, it is necessary to hold the ratio (e) not greater than 1. Thus, the range of $0.4 \leq e \leq 0.8$ is most desirable, as shown in FIG.4 where the upper and lower limits are represented by one-dotted chain lines, whereby the productivity of 40% to 80% and the welding strength rate of 88% to 97% are obtained.

The gasket as manufactured above is disposed between the cylinder block and cylinder head. When a compressive load is applied by the bolt between the cylinder block and cylinder head, the bead 3 is pressed and deformed downwardly in FIG.2 until the shim 4 contacts the cylinder block, because the height of the bead 3 is greater than the thickness of the shim 4. Consequently, the gasket is clamped tightly between the cylinder block and cylinder head with elastic restoring force caused by the compressed bead 3 after the shim 4 was compressed between the cylinder block and cylinder head. Also, since the shim 4 is welded on the base plate 1 by the laser welding machine with appropriate welding strength, an effective sealing is ensured around the cylinder opening 2, and the shim 4 is prevented from being separated from the base plate 1.

It should be apparent to one skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A metal gasket comprising:

a metallic base plate defining at least one opening; and an annular metallic shim disposed on said base plate around said opening thereof, said shim being welded on said base plate by spot welding to form a plurality of nuggets in series around said shim, with a space between the centers of two adjacent nuggets being held smaller than the diameter of a portion of each nugget at the mating surface between said base plate and said shim, said nuggets extending from the surface of said shim that is to be sealed and which is opposite to the side connected to said base plate, said nuggets extending to an inner portion of said base plate and surrounding said opening continuously.

2. A metal gasket as claimed in claim 1, wherein said annular metallic shim is welded on said base plate to form said nuggets so as to satisfy $0.4 \leq s/d \leq 0.8$, where s represents said space between the centers of two adjacent nuggets, and d represents said diameter of a portion of each nugget that is at the mating surface between said base plate and said shim.

3. A metal gasket as claimed in claim 2, wherein said base plate is provided with a bead protruded around said opening, and said shim is welded on said base plate at the side of said base plate with said bead protruded therefrom.

4. A metal gasket as claimed in claim 3, wherein said metal gasket is clamped between a cylinder head and a cylinder block of an internal combustion engine.

5. A process for manufacturing a metal gasket comprising the steps of:

forming at least one opening on a metallic base plate;

disposing an annular metallic shim on said base plate around said opening thereof: and welding said shim on said base plate by spot welding to form a plurality of nuggets in series around said shim, with a space s between the centers of two adjacent nuggets being held smaller than the diameter d of a portion of each nugget at the mating surface between said base plate and said shim, said nuggets extending from the surface of said shim that is to be sealed and which is opposite to the side connected to said base plate, said nuggets extending to an inner portion of said base plate, so as to surround said opening continuously.

6. A process as claimed in claim 5, wherein said annular metallic shim is welded on said base plate to form said nuggets to satisfy $0.4 \leq s/d \leq 0.8$, where s represents said space between the centers of two adjacent nuggets, and d represents said diameter of a portion of each nugget that is at the mating surface between said base plate and said shim.

7. A process as claimed in claim 6, further comprising a step of forming a bead around said opening of said base plate before welding said shim on said base plate, said shim being welded on said base plate at the side of said base plate with said bead protruded therefrom.

* * * * *